Patented May 12, 1936

2,040,233

UNITED STATES PATENT OFFICE 2,040,233

METHOD OF PREPARING CONTACT CATALYSTS

Homer Adkins, Madison, Wis.

No Drawing. Application June 8, 1932,
Serial No. 616,093

28 Claims. (Cl. 23—236)

This invention pertains to the preparation of contact catalysts, particularly contact catalysts adapted for hydrogenation and related processes. Among other things, the invention provides an efficient contact catalyst which is not only simple to prepare, but also easily reproducible. It makes possible a catalyst operating to bring about hydrogenation at a more rapid rate than catalysts heretofore known. Catalysts prepared in accordance with the invention herein described have been found to be efficient in the hydrogenation of aryl amines, including such difficultly reducible compounds as diphenylamine and aniline; heterocyclic amines, particularly pyridine and alpha picoline; nitriles, examples being benzyl cyanide and butyl cyanide, and aldehyde amines such as butyral cyclohexylamine and hydrobenzamide. They have also been found to be efficient in effecting the alkylation of ammonia and the amines.

For convenience in explaining the invention, it will be described herein as applied to a contact catalyst adapted for hydrogenation, but it is to be understood that its usefulness, rather than being limited to processes of hydrogenation, extends to other processes making use of contact catalysis. The invention comprehends the preparation of catalysts suitable for use in producing alcohols, aldehydes and other oxidation products of the hydrocarbons. It is also suitable for use in various other connections in which contact catalysis is used for promoting reaction, as for example in the alkylation of amines.

It has long been known that catalysts may be prepared by combining a catalyst carrier and an inorganic metal or metal oxide, examples being found in the use as catalyst carriers of kieselguhr, asbestos, pumice, etc. and in the use in conjunction therewith of nickel and its oxides. However, catalysts prepared in accordance with prior art practices have not been easily reproducible, by which is meant that it has not been possible with any degree of certainty to prepare a catalyst having properties identical with those of a catalyst previously made up. The preparation of such readily reproducible catalysts has long been recognized as desirable.

This desideratum is attained by the present invention. While involving only a few simple steps, it gives rise to highly efficient catalysts which are not only readily reproducible but also eminently satisfactory for use in hydrogenation. Briefly stated, the invention embraces the precipitation of a decomposable compound of a metal having an atomic weight greater than 58 but less than 64; viz, nickel, cobalt, copper from a mixture comprising a finely ground carrier such as kieselguhr and a salt, preferably soluble, of the metal. The precipitated metal compound together with the carrier is separated from the mixture and reduced by known methods to the elementary metal or the lower oxides of the metal.

A preferred method of carrying out the invention when nickel is the metal employed is disclosed in detail below. It should be understood that variations in proportions, chemicals, temperatures and the like may be readily made. Thus in place of the solution of sodium bicarbonate used for purposes of illustration in the example herein given, it is feasible to employ solutions of potassium bicarbonate, ammonium bicarbonate, sodium carbonate, potassium carbonate, ammonium carbonate, etc. Similarly, in place of the nickel nitrate referred to herein as suitable for the purposes of the invention, salts of cobalt and copper and other salts of nickel than nickel nitrate capable of reacting to form a carbonate or similar decomposable compound may be employed. Changes may be made from time to time by those skilled in the art, such changes, while departing from the example hereinbelow given, nevertheless falling within the scope of the invention.

Conveniently, 100 parts by weight of nitric acid washed kieselguhr are mixed with a solution comprising 100 parts of nickel nitrate hexahydrate in 150 parts of water. The resulting mixture is subjected to a process of levigation, as by grinding in a mortar, ball mill or other suitable apparatus, until it attains a cream-like consistency. This cream-like paste is then carefully heated to 70–80 degrees C., meanwhile stirring thoroughly. In place of the nickel nitrate hexahydrate specifically referred to above, it is possible to use equivalent quantities of other nickel nitrates and indeed of other nickel compounds, such as the sulphates, acetates and chlorides, capable of reacting with the carbonate in the manner characterizing nickel nitrate hexahydrate.

To the mass is then added a basic carbonate, preferably sodium bicarbonate, heated to a temperature of 70–80 degrees C. The sodium bicarbonate is added in the form of a solution of 60 parts of the bicarbonate in approximately 500 parts of water. The solution is added gradually until the addition of the carbonate has been completed, after which the mixture is vigorously stirred to insure homogeneity.

In order to segregate the solid constituents of the mass from the liquid constituents, the mass is then filtered. The filter cake is preferably washed on the filter with four portions each comprising 75 parts of water and is then twice suspended in 300 parts of water. The moist cake of impregnated kieselguhr is then broken up and dried at 100–110 degrees C. The dried material will be found to be in the neighborhood of 130 parts and to analyze 14 to 15 per cent nickel.

In handling the impregnated kieselguhr, care must be taken throughout the preparation of the material and in the subsequent storing to keep it out of contact with hydrogen sulfide, halogens, and other gases or air suspensions which tend to poison the catalyst. The active catalyst is prepared from the dried filter cake by reducing the impregnated kieselguhr in a stream of hydrogen or other reducing gas such as methanol or ethanol vapor or carbon monoxide at temperatures in the neighborhood of 425–475 degrees C. for a period of 60 to 80 minutes. The resulting product is a dark brown or black free-flowing pyrophoric powder which should be kept out of contact with the atmosphere and should preferably be used as soon as possible after being prepared. Catalysts of cobalt or copper may be similarly prepared.

The process above described departs from prior practice in respect of the levigation of the kieselguhr in the presence of the metal salt dispersion, in respect of the preferred use of sodium bicarbonate rather than sodium carbonate, and particularly in respect of the addition of the carbonate solution to the metal salt-kieselguhr mixture. The first of these changes is largely responsible for providing an easily reproducible catalyst, for it lends a uniformity which is not obtained under the practices of the prior art. The use of sodium bicarbonate, while not strictly necessary, is desirable in that it gives a basic carbonate of more uniform composition than can be obtained under ordinary conditions by the use of sodium carbonate. The addition of the carbonate to the metal salt-kieselguhr mixture has been found experimentally to give much better results than the addition of the metal salt-kieselguhr mixture to the carbonate, a practice which has heretofore been generally employed.

In order to test the efficacy of catalysts prepared in accordance with the present invention, a series of runs was made on sodium carbonate and sodium bicarbonate precipitated catalysts in which in one case, Method A, a nickel salt-kieselguhr mixture was added to the precipitant and in the other, Method B, the precipitant was added to a nickel salt-kieselguhr mixture as above described. As will be apparent from the table appearing below, the use of Method B served to reduce materially the time required for absorption of hydrogen by the catalyst during the period of its maximum activity. The relative values of the catalysts were measured for rate of hydrogenation of toluene, acetone, benzyl alcohol and resorcinal. The results are given in the table, the values not enclosed in parentheses corresponding to the time required for the absorption of the middle 60 percent of the total amount of hydrogen absorbed and those in parentheses referring to the time required for absorption of all the hydrogen.

*Time in minutes for hydrogenation over various catalysts*

| Catalyst | Method | Toluene | Acetone | Benzyl alcohol | Resorcinol |
|---|---|---|---|---|---|
| $Ni(NO_3)_2 + Na_2CO_3$ | (A) | 7.5±1.5 (11) | 12.5±3 (27) | 15±2 | 430±75 (1250) |
| $Ni(NO_3)_2 + Na_2CO_3$ | (B) | 6.5±2 (26) | 11.5±2 (18) | 8±1 | 275 (490) |
| $Ni(NO_3)_2 + NaHCO_3$ | (A) | 8.7±0.7 (21) | 18.5±2 (56) | 8.5±0.5 | 260±25 (540) |
| $Ni(NO_3)_2 + NaHCO_3$ | (B) | 6±1.0 (14) | 13.7±2 (34) | 8±2 | 217±8 (490) |

From this table it is evident that the addition of the precipitant to the nickel salt-kieselguhr mixture results, as compared with the combination of these materials in the reverse order, in a reduction of the time required for the absorption of the middle 60 percent of the hydrogen. In the case of toluene, this is evidenced by a reduction of the time, a sodium carbonate precipitated catalyst being used, from 7.5±1.5 to 6.5±2. Similarly, where the catalyst was precipitated by sodium bicarbonate, the time was reduced from 8.7±0.7 to 6.0±1.0. Corresponding results were obtained in the case of acetone and resorcinol.

In these experiments, the hydrogen pressure was maintained at 100 atmospheres. The ratio of grams of catalyst to mols of the material hydrogenated was as follows: acetone, 2:1; resorcinol, 2:0.62; benzyl alcohol, 2:0.32; toluene, 3:.0935. As a solvent for the resorcinol, ether was employed in the amount of 35 cc.

For purposes of comparison, a run was made on a catalyst prepared by precipitating nickel carbonate by means of sodium carbonate, the nickel salt-kieselguhr mixture being added to the precipitant. The nickel salt-kieselguhr mixture was prepared without levigating. For toluene, acetone, benzyl alcohol and resorcinol, respectively, the times required for absorption of the middle 60 percent of the hydrogen were as follows: 36±18, 40±10, 19±2, 562±12. The values for complete absorption of the hydrogen in the case of toluene, acetone, and resorcinol were 60, 66 and 1410, respectively. These figures indicate beyond any doubt that the grinding of the nickel salt and the kieselguhr together is highly desirable in rendering the mixture uniform and in reducing the time required for absorption of hydrogen.

To illustrate the possibility of employing equivalents in the example herein given, mention may be made of the fact that in place of sodium bicarbonate solution, which is preferably used in the practice of the invention, potassium bicarbonate, lithium bicarbonate, ammonium bicarbonate and others may be employed. In place of sodium carbonate may be used the corresponding potassium, lithium and ammonium compounds. Other salts of carbonic acid, either of the type exemplified by sodium carbonate or of the bicarbonate group, may also be used. In general, it usually is best to use a soluble carbonate, although this is not necessary. For example, a carbonate which is difficultly soluble may be employed, provided the same is capable of reacting with a nickel salt to precipitate nickel carbonate.

In place of the nickel nitrate, other nitrates of nickel of varying degrees of hydration may be employed. It is immaterial whether the nickelic or nickelous form be employed, it being merely necessary to provide so that an equivalent of the amount of nickel nitrate hexahydrate herein specified is used. In general, it is best to employ a nickel salt which is soluble in water although this feature may be varied as desired as, for example, by availing of salts which form suspensions in the liquid vehicle rather than true solutions. The term "dispersion" as herein used is intended to cover both types. In general, a salt will be preferred which is either readily decomposed or readily reduced to the lower oxides of nickel or to the element itself. Likewise in place of the nickel compounds, copper or cobalt compounds may be used in the practice of the invention to produce efficient catalysts.

Kieselguhr has been referred to herein as a suitable catalyst carrier, but it is not intended to exclude the various other carriers commonly used in contact catalysis. Other infusorial earths may be used, as may also almost all fluffy, porous substances, especially asbestos, but also glass, mineral wool, pumice, clay and the like. It will be noted that a characteristic common to most of these compounds resides in their foraminous nature. As herein used, the term "foraminous" is intended to include any material capable for use as a catalyst carrier which is characterized by porosity adapted to ready mixing of the nickel salt and the carrier itself.

It is intended that the patent shall cover, by suitable expression in the appended claims, whatever features of patentable novelty reside in the invention.

What is claimed is:

1. A process of preparing contact catalysts comprising the steps of levigating a foraminous carrier in the presence of a soluble salt of a metal having an atomic weight between 57 and 64, introducing a basic carbonate into the levigate, and reducing the precipitated metal carbonate in situ upon the carrier.

2. A process of preparing contact catalysts comprising the steps of levigating a foraminous carrier in the presence of a water dispersion of an inorganic salt of a metal having an atomic weight between 57 and 64, introducing a basic carbonate into the levigate, and reducing the precipitated metal carbonate in situ upon the carrier.

3. A process of preparing contact catalysts comprising the steps of levigating a foraminous carrier in the presence of a water dispersion of an inorganic salt of a metal having an atomic weight between 57 and 64, introducing an alkaline carbonate into the levigate, and reducing the precipitated metal carbonate in situ upon the carrier.

4. A process of preparing contact catalysts comprising the steps of levigating a foraminous carrier in the presence of a water dispersion of an inorganic salt of a metal having an atomic weight between 57 and 64, introducing an alkali metal carbonate into the levigate, and reducing the precipitated metal carbonate in situ upon the carrier.

5. A process of preparing contact catalysts comprising the steps of levigating a foraminous carrier in the presence of a soluble nickel salt, introducing a basic carbonate into the levigate, and reducing the precipitated nickel carbonate in situ upon the carrier.

6. A process of preparing contact catalysts comprising the steps of levigating a foraminous carrier in the presence of a water dispersion of an inorganic salt of nickel, introducing a basic carbonate into the levigate, and reducing the precipitated nickel carbonate in situ upon the carrier.

7. A process of preparing contact catalysts comprising the steps of levigating a foraminous carrier in the presence of a water dispersion of an inorganic salt of nickel, introducing an alkaline carbonate into the levigate, and reducing the precipitated nickel carbonate in situ upon the carrier.

8. A process of preparing contact catalysts comprising the steps of levigating a foraminous carrier in the presence of a water dispersion of an inorganic salt of nickel, introducing an alkali metal carbonate into the levigate, and reducing the precipitated nickel carbonate in situ upon the carrier.

9. A process of preparing contact catalysts comprising the steps of levigating a foraminous carrier in the presence of a nickel nitrate, introducing a basic carbonate into the levigate, and reducing the precipitated nickel carbonate in situ upon the carrier.

10. A process of preparing contact catalysts comprising the steps of levigating a foraminous carrier in the presence of a soluble nickel salt, introducing an alkali metal carbonate into the levigate, and reducing the precipitated nickel carbonate in situ upon the carrier.

11. A process of preparing contact catalysts comprising the steps of grinding a foraminous carrier in an aqueous dispersion of a nickel salt, introducing a basic carbonate capable of reacting with said nickel salt to form a nickel carbonate, segregating the solid constituents of the resulting mass, and subjecting the segregate to a process of reduction.

12. A process of preparing contact catalysts comprising the steps of grinding kieselguhr in an aqueous dispersion of a nickel salt, introducing a basic carbonate capable of reacting with said nickel salt to form a nickel carbonate, segregating the solid constituents of the resulting mass, and subjecting the segregate to a process of reduction.

13. A process of preparing contact catalysts comprising the steps of grinding a foraminous carrier in an aqueous solution of nickel nitrate, introducing a basic carbonate capable of reacting with said nickel nitrate to form a nickel carbonate, segregating the solid constituents of the resulting mass, and subjecting the segregate to a process of reduction.

14. A process of preparing contact catalysts comprising the steps of grinding a foraminous carrier in an aqueous dispersion of a nickel salt, introducing a bicarbonate capable of reacting with said nickel salt to form a nickel carbonate, segregating the solid constituents of the resulting mass, and subjecting the segregate to a process of reduction.

15. A process of preparing contact catalysts comprising the steps of grinding a foraminous carrier to a paste in the presence of a nickel salt dispersed in a liquid vehicle, adding to the paste a solution of an alkali metal carbonate, filtering to separate the solid constituents of the mass from the liquid constituents, and subjecting the separated solid constituents to the action of hydrogen at an elevated temperature.

16. A process of preparing contact catalysts comprising the steps of grinding a foraminous carrier to a paste in the presence of a nickel nitrate dispersed in a liquid vehicle, adding to the paste a solution of an alkali metal carbonate, filtering to separate the solid constituents of the mass from the liquid constituents, and subjecting the separated solid constituents to the action of hydrogen at an elevated temperature.

17. A process of preparing contact catalysts comprising the steps of grinding kieselguhr to a paste in the presence of a nickel salt dispersed in a liquid vehicle, adding to the paste a solution of an alkali metal bicarbonate, filtering to separate the solid constituents of the mass from the liquid constituents, and subjecting the separated solid constituents to the action of hydrogen at an elevated temperature.

18. A process of preparing contact catalysts comprising the steps of grinding kieselguhr to a paste in the presence of a nickel nitrate dispersed in a liquid vehicle, adding to the paste a solution of an alkali metal carbonate, filtering to separate the solid constituents of the mass from the liquid constituents, and subjecting the separated solid constituents to the action of hydrogen at an elevated temperature.

19. A process of preparing contact catalysts comprising the steps of grinding kieselguhr to a paste in the presence of nickel nitrate dispersed in a liquid vehicle, adding to the paste a solution of an alkali metal carbonate, filtering to separate the solid constituents of the mass from the liquid constituents, and subjecting the separated solid constituents to the action of hydrogen at a temperature in the neighborhood of 450 degrees C.

20. A process of preparing contact catalysts comprising the steps of grinding kieselguhr to a paste in the presence of a nickel nitrate dispersed in a liquid vehicle, adding to the paste a solution of an alkali metal carbonate, filtering to separate the solid constituents of the mass from the liquid constituents, and subjecting the separated solid constituents to the action of hydrogen at a temperature in the neighborhood of 450 degrees C. for a period of approximately an hour.

21. In the preparation of contact catalysts, the step which comprises adding a solution of a basic carbonate to the paste obtained by grinding a formaminous catalyst carrier in the presence of a dispersion of a nickel salt in a liquid vehicle.

22. In the preparation of contact catalysts, the step which comprises adding a solution of an alkali metal bicarbonate to the paste obtained by grinding a foraminous catalyst carrier in the presence of a dispersion of a nickel salt in a liquid vehicle.

23. In the preparation of contact catalysts, the step which comprises adding a solution of an alkali metal bicarbonate to the paste obtained by grinding a catalyst carrier in the presence of a dispersion of nickel nitrate in a liquid vehicle.

24. A process of preparing contact catalysts comprising the steps of grinding acid-washed kieselguhr in the presence of an equal quantity of nickel nitrate hexahydrate, said nickel nitrate hexahydrate being dissolved in water; heating the resulting mass to a temperature in the neighborhood of 70–80 degrees C.; precipitating the nickel as a basic carbonate by adding sodium bicarbonate in approximately two thirds the amount of the nickel nitrate hexahydrate employed, said sodium bicarbonate being added in solution; separating the kieselguhr and the basic nickel carbonate from the other constituents of the mass by filtering, and reducing the basic nickel carbonate to nickel in situ upon the kieselguhr.

25. In the preparation of contact catalysts, the step which comprises adding a precipitant to a levigated soluble nickel salt-kieselguhr mixture.

26. In the preparation of contact catalysts, the step which comprises grinding nitric acid washed kieselguhr to a paste in the presence of an aqueous solution of nickel nitrate.

27. A process of preparing contact catalysts comprising the steps of grinding to a paste acid-washed kieselguhr in the presence of an aqueous solution of a nickel salt; heating the resulting mass to a temperature in the neighborhood of 70–80° C., precipitating the nickel as a basic carbonate by adding an aqueous solution of an alkali metal bicarbonate; separating the kieselguhr and the basic nickel carbonate from the other constituents of the mass by filtering, and reducing the basic nickel carbonate to nickel in situ upon the kieselguhr.

28. A process of preparing contact catalysts comprising the steps of grinding kieselguhr in the presence of an aqueous solution of an inorganic salt of a metal having an atomic weight between 57 and 64; precipitating the metal as a basic carbonate by adding an aqueous solution of an alkali metal or ammonium bicarbonate; separating the kieselguhr and the basic metal carbonate from the other constituents of the mass, and reducing the basic metal carbonate in situ upon the kieselguhr.

HOMER ADKINS.